United States Patent [19]

Montague et al.

[11] Patent Number: 5,021,525
[45] Date of Patent: Jun. 4, 1991

[54] PROCESS FOR THE MANUFACTURE OF POLYMERS

[75] Inventors: Peter G. Montague, Warwicks; Philip A. Lagar, Rugby; Peter Bainbridge, Northants, all of United Kingdom

[73] Assignee: National Starch and Chemical Investment Holding Corporation, Wilmington, Del.

[21] Appl. No.: 365,058

[22] Filed: Jun. 12, 1989

[30] Foreign Application Priority Data

Jun. 13, 1988 [GB] United Kingdom ............... 8813966

[51] Int. Cl.$^5$ ................... C08F 2/10; C08F 218/0; C08F 222/0
[52] U.S. Cl. .................. 526/210; 526/317.1; 526/318.2; 526/328.5; 526/329.7; 526/346; 526/59
[58] Field of Search ............ 526/59, 329.7, 328.5, 526/210, 317.1, 318.2, 346, 328.5, 329.7

[56] References Cited

U.S. PATENT DOCUMENTS

| | | | |
|---|---|---|---|
| 3,235,505 | 2/1966 | Tuvell | 252/135 |
| 3,328,309 | 6/1967 | Grifo et al. | 252/137 |
| 3,457,176 | 7/1969 | Huggins | 252/135 |
| 3,554,913 | 1/1971 | Glasser et al. | 252/56 |
| 3,719,647 | 3/1973 | Hardy et al. | 260/86.1 R |
| 3,915,921 | 10/1975 | Schlatzer Jr. | 260/17.4 SG |
| 3,940,351 | 2/1976 | Schlatzer, Jr. | 260/17.4 SG |
| 4,421,902 | 12/1983 | Chang et al. | 526/317 |
| 4,524,175 | 6/1985 | Stanley | 524/831 |
| 4,524,186 | 6/1985 | Nagase | 526/328.5 |
| 4,559,159 | 12/1985 | Denzinger et al. | 252/174.24 |
| 4,836,933 | 6/1989 | Montague et al. | 210/701 |

FOREIGN PATENT DOCUMENTS

| | | |
|---|---|---|
| 1152668 | 8/1983 | Canada ............... 400/49 |
| 0011806 | 11/1979 | European Pat. Off. . |
| 0057875 | 1/1982 | European Pat. Off. . |
| 0099179 | 6/1983 | European Pat. Off. . |
| 0215565 | 8/1986 | European Pat. Off. . |
| 0216479 | 8/1986 | European Pat. Off. . |
| 0224006 | 10/1986 | European Pat. Off. . |
| 498383 | 1/1939 | United Kingdom . |
| 1351304 | 4/1974 | United Kingdom . |
| 1506427 | 4/1978 | United Kingdom . |

OTHER PUBLICATIONS

"Random Copolymers as Dispersion Stabilisers, Part 1 Synthesis and Solution Properties", Buscall et al. Colloids and Surfaces, 17(1986 25–38; Elsevier Science Publishers B. V., Amsterdam—Printed in The Netherlands.

Primary Examiner—Joseph L. Schofer
Assistant Examiner—Tom Weber
Attorney, Agent, or Firm—Ellen T. Dec

[57] ABSTRACT

A process for the preparation of polymers containing at least one hydrophilic monomeric component and at least one hydrophobic monomeric component comprising the step of polymerizing the monomers in the presence of free radical polymerization initiators in an aqueous medium consisting of water and a cosolvent, wherein the amount of cosolvent is monitored so as to maintain the ratio of water to cosolvent equal or greater than unity during the reaction, thereby keeping the polymer as it forms in a sufficiently mobile condition and preventing homopolymerization and precipitation of the polymer from the hydrophobic monomer; thereby producing a polymer as a relatively high solids, low viscosity, opaque or semi-opaque product which is stable and slightly cloudy, opaque or semi-opaque, which exhibits no gelling, coagulation or product separation on standing and which, upon dilution to 0.25% solids content w/w, has a turbidity of at least 10 Nephelometric Turbidity units.

19 Claims, No Drawings 5,021,525

PROCESS FOR THE MANUFACTURE OF POLYMERS

FIELD OF THE INVENTION

This invention relates to a process for the preparation of polymeric compositions comprising at least one hydrophilic monomeric component and at least one hydrophobic monomeric component. Polymers of this class are especially adapted for use in detergent compositions.

BACKGROUND OF THE INVENTION

Polymers containing both hydrophilic and hydrophobic moieties are useful in a wide variety of applications. Unfortunately, preparation of these polymers is often difficult, inefficient, and not cost effective, particularly when it is desired to prepare the polymer in relatively high solids, low viscosity, essentially aqueous form. Preparation of these polymers have frequently been described in the prior art.

GB No. 1,052,924 discusses the polymerization of methacrylic acid with stearyl or lauryl methacrylate in a wide range of non-aqueous solvents. This method suffers from the fact that the solvents are toxic and expensive and the final form of the polymer is inconvenient to use due to the presence of these solvents.

Buscall and Corner in Colloids and Surfaces Vol. 17 (1986), pages 25 through 38, describe a method for preparing copolymers and terpolymers of acrylic acid with lauryl methacrylate. This method uses ethanol solvent, the mixtures of the monomers are added over 6 hrs, and the reaction is complete only after 48 hrs, 3 days and even up to 3 weeks. The ethanol is then removed by distillation after neutralization of the polymers in order to effect their dissolution in water.

Other methods describe the use of a mixture of water and a suitable cosolvent, where the water to cosolvent ratio is less than unity, so that the cosolvent is used in excess. This amount of cosolvent is expensive to use and time consuming and costly to remove by distillation if an essentially aqueous preparation of the polymer is desired.

For example, Buscall and Corner in EP No. 99179 describe the preparation of these copolymers in pure cosolvent, and subsequent work-up of the preparation to provide aqueous solutions by distillation and total solvent exchange. Thus, in Example 20, this procedure is followed, starting from an aqueous cosolvent mixture where the water content is in a ratio of 1.5:65 parts of water:acetone.

Hydrophobic acrylonitrile emulsions are produced in GB No. 1,351,304, in a form of non-aggregated particles, in a medium of dimethyl sulphoxide and water. The ratio of dimethyl sulphoxide to water is from 85:15 to 60:40, i.e. where the cosolvent is in excess to water.

GB No. 215,565 teaches preparation of copolymers of acrylic acid and various hydrophobic ethoxylated monomers in a mixture of isopropanol and water, where the ratio of water to isopropanol is 125:240.

In addition to using cosolvent in excess, the polymer can be produced in a limpid (clear) solution form, and this of necessity, will have a high viscosity at relatively low solids. For example, GB No. 498,383 prepares copolymers of vinyl alkyl ketones in aqueous monohydric alcohols. Although the solvent preparations are claimed to vary within wide limits, the exemplified polymers are prepared where the cosolvent is present in an amount of at least 60%. No examples are described where the water present is in excess or where the polymers are not in a limpid (clear) state.

An alternative method is to use an emulsifier to disperse the hydrophobic monomer and to subsequently obtain a copolymer having a uniform composition. The need for emulsifiers increases the cost of the polymerization process and may have a deleterious effect on the properties of the final polymer. Thus, EP No. 57,875 teaches polymerization of the hydrophobic and hydrophilic species in an aqueous medium containing an emulsifier for the hydrophobic monomer. This is exemplified by sodium dodecyl sulphate, and is essential for the preparation of homogeneous stable copolymers.

Cosolvent can be omitted altogether, when the hydrophobic moieties are more hydrophilic, by the inclusion of ethoxylate surfactant coponents in the monomers. Thus, in U.S. Pat. No. 4,559,159, polymers of surfactant type monomers having pendent hydrophobic portions are polymerized with water soluble monomers, preferably acrylic acid, to give copolymers useful in detergent compositions. A preferred method is copolymerization in aqueous solution although precipitation and suspension polymerization is described.

SUMMARY OF THE INVENTION

We have now found that hydrophilic/hydrophobic polymers can be efficiently prepared using conventional aqueous polymerization procedures, but employing a process wherein the polymerization is carried out in the presence of a suitable cosolvent and wherein the amount of cosolvent is carefully monitored so as to maintain the ratio of water to cosolvent equal or greater than unity during the reaction, thereby keeping the polymer as it forms in a sufficiently mobile condition and preventing unwanted homopolymerization and precipitation of the polymer from the hydrophobic monomer. The process of the invention provides a product in a unique form as a relatively high solids, low viscosity, opaque or semi-opaque product intermediate between a true clear or limpid solution, and an emulsion consisting entirely of non-agglomerated particles. The product exhibits no gelling, coagulation or product separation on standing for at least two weeks. It is further characterized in that upon dilution to 0.25% solids content w/w, the turbidity of the resultant preparation is at least 10 Nephelometric Turbidity Units (N.T.U.'s).

DETAILED DESCRIPTION OF THE INVENTION

Water soluble monomers suitably employed to form the hydrophilic backbone include those which are sufficiently water soluble to form at least a one weight percent solution when dissolved in water and readily undergo polymerization to form polymers which are water soluble at ambient temperature and at a pH of 3.0 to 12.5, preferably more than 1 gram per liter, more preferred more than 5 grams per liter, most preferred more than 10 grams per liter. Exemplary water soluble monomers include ethylenically unsaturated amides such as acrylamide, methacrylamide and fumaramide and their N-substituted derivatives such as 2-acrylamido-2-methylpropane sulfonic acid, N-(dimethylaminomethyl) acrylamide as well as N-(trimethylammoniummethyl) acrylamide chloride and N-(trimethylammoniumpropyl)methacrylamide) chloride; ethylenically unsaturated carboxylic acids or dicarboxylic acids such as acrylic acid, maleic acid, methacrylic acid, itaconic acid, fumaric acid, crotonic acid, aconitic acid and citraconic acid; and other ethylenically unsaturated quaternary ammonium compounds such as vinylbenzyl trimethyl ammonium chloride; sulfoalkyl esters of unsaturated carboxylic acids such as 2-sulfoethyl methacrylate; aminoalkyl esters of unsaturated carboxylic acids such as 2-aminoethyl methacrylate, dimethyl aminoethyl (meth)acrylate, diethyl aminoethyl (meth)acrylate, dimethyl aminomethyl (meth)acrylate, diethyl aminomethyl (meth)acrylate, and their quatenary ammonium salts; vinyl or allyl amines such as vinyl pyridine and vinyl morpholine or allylamine; diallyl amines and diallyl ammonium compounds such as diallyl dimethyl ammonium chloride; vinyl heterocyclic amides such as vinyl pyrrolidone; vinyl aryl sulfonates such as vinylbenzyl sulfonate; vinyl alcohol obtained by the hydrolysis of vinyl acetate; acrolein; allyl alcohol; vinyl acetic acid; sodium vinyl sulphonate; sodium allyl sulphonate, as well as the salts of the foregoing monomers. These monomers may be used singly or as mixtures thereof.

Optionally, the hydrophilic backbone may contain small amounts of relatively hydrophobic units, e.g., those derived from polymers having a solubility of less than 1 g/l in water, provided that the overall solubility of the hydrophilic polymer backbone still satisfies the solubility requirements as specified here above. Examples of relatively water insoluble polymers are polyvinyl acetate, polymethyl methacrylate, polyethyl acrylate, polyethylene, polypropylene, polystyrene, polybutylene oxide, polypropylene oxide, polyhydroxypropyl acrylate.

Suitable hydrophobic monomers generally include those which are (1) water-insoluble, i.e., less than 0.2 weight part of the hydrophobic monomer will dissolve in 100 weight parts water and (2) ethylenically unsaturated compounds having hydrophobic moieties. The hydrophobic moieties (when isolated from their polymerizable linkage) are relatively water insoluble, preferably less than 1 g/l, more preferred less than 0.5 g/l, most preferred less than 0.1 g/l at ambient temperature and a pH of 3.0 to 12.5.

The hydrophobic moieties preferably have at least 5 carbon atoms and are most preferably pendant organic groups having hydrophobicities comparable to one of the following: aliphatic hydrocarbon groups having at least five carbons such as $C_5$ to $C_{50}$ alkyls and cycloalkyls; polynuclear aromatic hydrocarbon groups such as napthyls; alkylaryls wherein the alkyl group has one or more carbons; haloalkyls of 5 or more carbons, preferably perfluoralkyls; polyalkylenoxy groups wherein alkylene is propylene or high alkylene and there is at least one alkyleneoxy unit per hydrophobic moiety; and siloxane moieties. Exemplary hydrophobic monomers include the higher alkyl esters of alpha, beta ethylenically unsaturated carboxylic acids such as dodecyl acrylate, dodecyl methacrylate, tridecyl acrylate, tridecyl methacrylate, tetradecylacrylate, tetradecylmethacrylate, octadecyl acrylate, octadecyl methacrylate, octyl half ester of maleic anhydride, dioctyl diethyl maleate, and other alkyl esters and half esters derived from the reactions of alkanols having from 5 to 50 carbon atoms with ethylenically unsaturated carboxylic acids such as acrylic acid, methacrylic acid, maleic anhydride, fumaric acid, itaconic acid and aconitic acid; alkylaryl esters of ethylenically unsaturated carboxylic acids such as nonyl-a-phenyl acrylate, nonyl-a-phenyl methacrylate, dodecyl-a-phenyl acrylate and dodecyl-a-phenyl methacrylate; N-alkyl, ethylencially unsaturated amides such as N-octadecyl acrylamide; N-octadecyl methacrylamide, N,N-dioctyl acrylamide and similar derivatives thereof, a-olefins such as octene-1, decene-1, dodecene-1 and hexadecene-1; vinyl alkylates wherein alkyl has at least 4 carbon atoms such as vinyl laurate and vinyl stearate; vinyl alkyl ethers such as dodecyl vinyl ether and hexadecyl vinyl ether; N-vinyl amides such as N-vinyl lauramide and N-vinyl stearamide; and alkylstyrenes such as t-butyl styrene. The hydrophobic monomer may be used singly or mixtures thereof may be employed. The ratio of hydrophilic to hydrophobic monomers may vary from about 100:1 to 5:1. The molecular weight average weights (Mw.) of the resultant polymers varying from 500 to 100,000 or above when measured by gel permeation chromotography using a polyacrylate standard.

Gel permeation chromatography (GPC) is widely used to measure the molecular weight distribution of water soluble polymers. By this method a calibration is constructed from polymer standards of known molecular weight and a sample of unknown molecular weight distribution is compared with this.

When the sample and standards are of the same chemical composition, the approximate true molecular weight of the sample can be calculated, but if such standards are not available, it is common practice to use some other well characterized standards as a reference. The molecular weight obtained by such means is not the absolute value, but is useful for comparative purposes. Sometimes it will be less than that resulting from a theoretical calculation for a dimer.

It is possible that when the same sample is measured, relative to different sets of standards, different molecular weights can be obtained. We have found this to be the case when using polyethylene glycol, polyacrylate and polystyrene sulphonate standards. For the compositions of the present invention exemplified hereinbelow, the molecular weight is specified by reference to the appropriate GPC standard.

The process of the present invention is particularly suitable for the preparation of deflocculating polymers disclosed in co-pending application Ser. No. 07/365,080 filed of even dated herewith. Thus, the process of the invention is especially useful for preparation of polymers of the general formula:

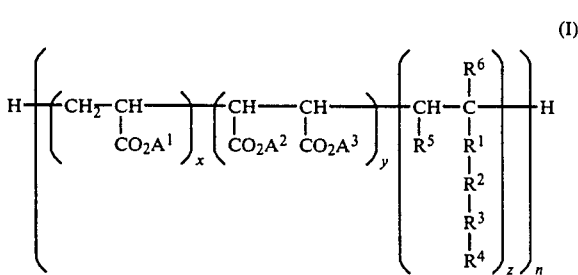

(I)

wherein
z is 1; (x+y): z is from 5:1 to 100:1; in which the monomer units may be in random order; y being from 0 up to a maximum equal to the value of x; and n is at least 1;

$R^1$ represents —CO—O, —O—, —O—CO—, —CH$_2$—, —CO—NH— or is absent;

$R^2$ represents from 1 to 50 independently selected alkyleneoxy groups, preferably ethylene oxide or propylene oxide groups, or is absent, provided that when $R^3$ is absent and $R^4$ represents hydrogen, then $R^2$ must contain an alkyleneoxy group with at least 3 carbon atoms;

$R^3$ represents a phenylene linkage, or is absent;

$R^4$ represents hydrogen or a $C_{5-24}$ alkyl or $C_{5-24}$ alkenyl group, with the provisos that:
(a) when $R^1$ represents —O—CO—, $R^2$ and $R^3$ must be absent and $R^4$ must contain at least 5 carbon atoms and
(b) when $R^2$ is absent, $R^4$ is not hydrogen and when $R^3$ is absent then $R^4$ must contain at least 5 carbon atoms;

$R^5$ represents hydrogen or a group of formula —$COOA^4$;

$R^6$ represents hydrogen or $C_{1-4}$ alkyl; and $A^1$, $A^2$, $A^3$ and $A^4$ are independently selected from hydrogen, alkali metals, alkaline earth metals, ammonium and amine bases.

Another class of polymers produced in accordance with the present invention comprise those of formula II:

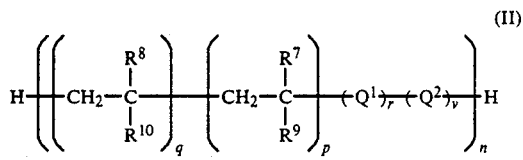

wherein:

$Q^2$ is a molecular entity of formula IIa:

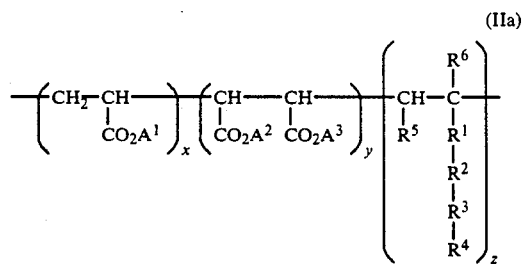

wherein
z and $R^{1-6}$ are as defined for formula (I); $A^{1-4}$ are as defined for formula (I);

$Q^1$ is a multifunctional monomer, allowing the branching of the polymer, wherein the monomers of the polymer may be connected to $Q^1$ in any direction, in any order, therewith possibly resulting in a branched polymer. Preferably $Q^1$ is trimethyl propane triacrylate (TMPTA), methylene bisacrylamide or divinyl glycol.

n and z are as defined above; v is 1; and (x+y+p+q+r): z is from 5:1 to 100:1; in which the monomer units may be in random order; and preferably either p and q are zero, or r is zero;

$R^7$ and $R^8$ represent —$CH_3$ or —H;

$R^9$ and $R^{10}$ represent substituent groups such as amino, amine, amide, sulphonate, sulphate, phosphonate, phosphate, hydroxy, carboxyl and oxide groups, or $(C_2H_4O)_tH$, wherein t is from 1-50, and wherein the monomer units may be in random order. Preferably they are selected from —$SO_3Na$, —CO—O—$C_2H_4$, —$OSO_3Na$, —CO—N-H—$C(CH_3)_2$—$CH_2$—$SO_3Na$, —CO—$NH_2$, —O—CO—$CH_3$, —OH.

In any particular sample of polymer material in which polymers of formulae I and II are in the form of a salt, usually, some polymers will be full salts ($A^1$-$A^4$ all other than hydrogen), some will be full acids ($A^1$-$A^4$ all hydrogen) and some will be part-salts (one or more $A^1$-$A^4$ hydrogen and one or more other than hydrogen).

The salts of the polymers of formulae I and II may be formed with any organic or inorganic cation defined for $A^1$-$A^4$ and which is capable of forming a water-soluble salt with a low molecular weight carboxylic acid. Preferred are the alkali metal salts, especially of sodium or potassium.

Another class of polymers produced in acordance with the present invention comprise those of formula III.

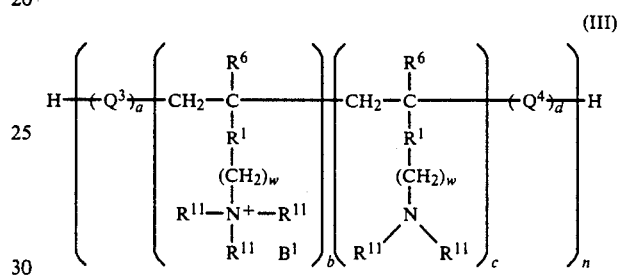

wherein $Q^3$ is derived from a monomeric unit IIIa comprising

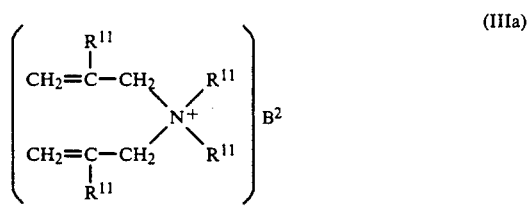

$Q^4$ is derived from the molecular entity IIIb

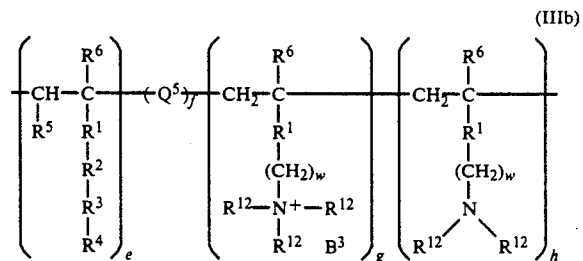

and $Q^5$ is derived from a monomeric unit IIIc

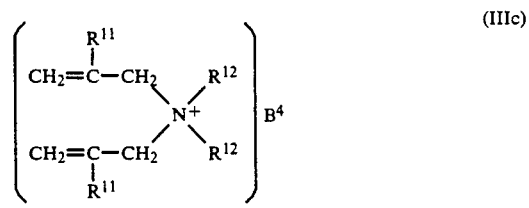

$R^1-R^6$ are defined as in formula I, (a+b+c): $Q^4$ is from 5:1 to 100:1, in which the monomer units may be in random order, a, b, c, d, e, f, g, h may be an integer of zero, n is at least 1;

$B^1$, $B^2$, $B^3$, $B^4$ are organic or inorganic anions;

w is zero to 4;

$R^{11}$ is independently selected from hydrogen or $C_1-C_4$ alkyl; and $R^{12}$ is independently selected from $C_5$ to $C_{24}$ alkyl or alkenyl, aryl cycloalkyl, hydroxyalkyl, or alkoxyalkyl The anions represented by $B^1$, $B^2$, $B^3$, $B^4$ are exemplified by the halide ions, sulphate sulphonate, phosphate, hydroxide, borate, cyanide, carbonate, bicarbonate, thiocyanate, isocyanate, sulphide, cyanate, acetate and the other common inorganic and organic ions. Preferred anions are chloride and sulphate.

The general formulae I, II and III are to be construed as including those mixed copolymer forms wherein, within a particular polymer molecule where n is 2 or greater, $R^1-R^{12}$ differ between individual monomer units therein.

For the polymers of formula I and II and their salts, it is preferred to have a weight average molecular weight in the region to from 500 to 500,000, most preferably from 1000 to 30,000, especially from 2000 to 10,000 when measured by GPC using polyacrylate standards. For the purposes of this definition, the molecular weights of the standards are measured by the absolute intrinsic viscosity method described by Noda, Tsoge and Nagasawa in Journal of Physical Chemistry, Volume 74, (1970), pages 710–719.

It is difficult to determine accurately the molecular weight distribution of polymers of Formula III, because of the highly cationic nature of these polymers and subsequently adsorption on the GPC columns. Instead, a measure of molecular weight can be made by measuring a standard viscosity (S.V.), determined at 15.0% solids, 23° C. in a 1.0 molar sodium chloride solution using a Brookfield Synchro-lectric® viscometer, Model LVT with a LCP adaptor, at a speed of 60 RPM. It is preferred to have a polymer with a S.V. from 1 to 100 cps., more preferably from 2–50 cps., most preferably 3–25 cps.

The particular cosolvent chosen for the reaction will vary depending upon the particular monomers to be polymerized. The cosolvent selected should be miscible with water, dissolve at least one of the monomers, but not react with the monomers or with the polymer as it is produced and be substantially readily removed by simple distillation or azeotropic distillation procedures. Suitable cosolvents include, but are not limited to lower ($C_1$ to $C_4$) alcohols, acetone, esters, and ketones. Isopropanol and n-propanol are the most preferred.

The ratio of water to cosolvent must be carefully regulated. If too low an amount of cosolvent is employed, precipitation of hydrophobic monomer or homopolymer may occur, too high a cosolvent level is more expensive and time consuming to remove; results in too high viscosity product and, in some cases, may cause precipitation of the water soluble polymer. It will be apparent to one skilled in the art that the precise ratio of water to cosolvent will vary depending upon the specific hydrophilic and hydrophobic monomers employed as well as the amounts thereof; the particular cosolvent chosen and the desired molecular weight of the final polymer.

In all cases, however, it is critical that the ratio of water to cosolvent is equal or greater than unity during the reaction. The specific ratios for particular co- and ter-polymer systems are described in greater detail in the examples presented herein.

While the water/cosolvent ratios recorded in the examples contained herein are noted at the "start" and "end" of the reaction, it will be understood that the practitioner could use lower water/cosolvent levels in the initial charge and subsequently adjust the levels since it is the water/cosolvent ratios during the actual polymerization procedure which are important to the process of the invention.

The polymerization is carried out in the presence of free-radical initiators. Examples of water-soluble free-radical initiators which are suitable for the polymerization are the usual thermal decomposition initiators such as hydrogen peroxide, peroxydisulfates, especially sodium peroxydisulfate or ammonium peroxydisulfate, or 2,2'-azobis(2-amidinopropane) hydrochloride. Redox initiators such as tertiary butyl hydroperoxide/bisulphite tertiary butyl hydroperoxide/sodium formaldehyde sulphoxylate; or hydrogen peroxide with a ferrous compound can also be used.

From 0.1 to 5% by weight, based on the sum of the monomers, of the initiators is present in the mixture. The polymerization takes place in an aqueous cosolvent medium, and the concentration is advantageously chosen so that the aqueous cosolvent solution contains from 10 to 55%, preferably from 20 to 40% by weight of total monomers. The reaction temperature can vary within wide limits, but is advantageously chosen to be from 60° to 150° C., preferably from 70° to 95° C. If the reaction is carried out at above the boiling point of water, a pressure-tight vessel, such as an autoclave, is chosen as the reaction vessel.

Furthermore, the regulators conventionally used for free-radical polymerization in an aqueous medium, e.g. thioglycolic acid or $C_1$ to $C_4$ aldehydes, or chain lengtheners, such as methylene bisacrylamide or divinyl glycol, can be employed, the amounts being from 0.1 to 10% by weight, preferably from 0.5 to 5% by weight, the percentages being based on the total amount of the monomers.

The turbidity of the prepared polymers was measured using a Hach Model 2100A Turbidimeter. It was found that direct measurement on the polymers was not possible, and that useful readings could only be made when the polymers were diluted to 0.25% solids content w/w with deionized water. Measurements were made at ambient temperatures and no further adjustments were made to the diluted sample. The turbidity was read from the scale as Nephelometric Turbidity Units (N.T.U.'s)

In the illustrative, but not limiting, examples which follow, all parts are by weight and all temperatures in degrees Celsius unless otherwise noted. It is also noted that, in some tables reference is made to cosolvent/monomer and cosolvent/polymer ratios, however the ratio is actually that of water plus cosolvent to monomer or polymer.

EXAMPLE I

A monomer mixture was prepared consisting of a hydrophilic monomer acrylic acid 216 g, (3.0 moles) and a hydrophobic monomer, Methacrylester 13, a methacrylic ester with average chain length of 13 carbons available from Rohm, 32 g (0.12 moles). This gave a molar ratio of hydrophilic to hydrophobic monomer of 25:1.

To a 2 liter glass round bottom reaction vessel, equipped with a condenser, stainless steel paddle stirrer, and thermometer was added 600 gms of an aqueous mixture of isopropanol and water, consisting of 400 grams deionized water and 200 g isopropanol. This gave a ratio of water cosolvent mixture to total weight of monomers 2.42:1 and a water to isopropanol ratio of 2:1.

The monomer mixture was pumped into the reaction vessel over a period of about 3 hours keeping the reaction mass at 80°–85° C., and simultaneously introducing, over a period of 4 hours, by pumping in an independent stream, an initiator solution consisting of a 100 g of 4% aqueous solution of sodium persulphate.

After the addition of the initiator, the ratio of water and cosolvent to polymer had risen to 2.82:1 and the water to isopropanol ratio to 2.5:1. The reaction contents were held at 80°–85° C. for a period of about one further hour, giving a total time from the start of the monomer and initiator additions of about 5 hours.

The isopropanol was then substantially removed from the reaction product by azeotropic distillation under vacuum, until the residual isopropanol content was less than 1% as measured by direct gas liquid chromatography using a flame ionization detector.

The polymer was neutralized to approximately pH7 by adding, at 40° C. and below, 230 grams (2.76 moles) of 48% caustic soda solution with water added back as necessary to bring the solids to approximately 35%.

The product was an opaque viscous product, having a solids content of approximately 35% and a viscosity of 1500 cps at 23° C. as measured by a Brookfield Synchro-Lectric ® viscometer model RVT, spindle 4, at 20 rpm.

The molecular weight distribution of the polymer produced was measured by aqueous gel permeation chromatography, using an ultra violet detector set at 215 nm. The number average (Mn) and weight average (Mw) molecular weights were measured from the chromatogram so produced, using fractionated sodium polyacrylate standards to construct a calibration graph. The molecular weight of these standards had been measured by the absolute intrinsic viscosity method described by Noda, Tsuge and Nagasawa in the Journal of Physical Chemistry, Vol. 74 (1970), pages 710 to 719.

The polymer produced had a Mn of 1600 and Mw of 4300. The pH of the product was 7.0 and an 0.25% solution of the product had a turbidity of 110 N.T.U's.

EXAMPLE II

Using the same general method as in Example I, four additional copolymers (IIA–IID) employing the same monomers were prepared in order to determine the precise water-cosolvent ratios useful in the preparation of this specific copolymer.

The water-isopropanol ratios were varied as noted in Table I. Table I also shows the properties of the polymers produced.

TABLE I

| | Water: Isopropanol Ratio | | Polymer Produced | | | | | Turbidity |
|---|---|---|---|---|---|---|---|---|
| Sample | Start of Reaction | End of Reaction | Mn | Mw | pH | % Solids | Visc. cps | (0.25%, N.T.U.'s) |
| I | 2.0 | 2.5 | 1600 | 4300 | 7.0 | 35.6 | 1500 | 110 |
| IIA | 2.0 | 6.0 | — | — | — | — | — | 400 |
| IIB | 3.0 | 3.7 | 1800 | 5400 | 6.5 | 34.9 | 300 | 500 |
| IIC | 1.4 | 1.8 | 1350 | 3500 | 7.8 | 35.0 | 9000 | 10 |
| IID | 1.0 | 1.3 | 1000 | 2900 | 7.4 | 34.0 | 35000 | 1.8 |

In contrast to the copolymer of Example I which exhibits an optimum balance of high solids and low viscosity, the cosolvent ratios used in Example IIA gave a severely coagulated product with a large amount of sticky coagulum coating the reactor walls and stirrer. The ratio used in Example IIB is the maximum water isopropanol ratio useful in producing this specific copolymer since the resultant product was an opaque, thin liquid containing a small amount (about 5%) of coagulum. As the ratio of water to isopropanol was reduced in Example IIC, the product became thicker but remained semi-opaque and homogeneous, while the ratio in Example IID gave a practically clear, homogeneous extremely thick product which had to be diluted prior to application. Example IID required dilution to 26.7% solids in order to achieve a viscosity of 1100 cps, similar to that of Example I. This gives an advantage of about 9% in solids content of Example I over Example II, and is important economically for reactor throughput of product during manufacture, transportation, storage and lack of dilution before use.

In summary, for the specific hydrophilic/hydrophobic monomer mixture used to produce a polymer of approximately 1500 Mn, a 3500 to 5500 Mw, solids level of about 35%, and a viscosity of 500 to 10,000 cps, the water to isopropanol ratio should be within the range of 1.4 to 3.7 during the reaction. In addition, the turbidity of an 0.25% solution of the polymer should be 10 N.T.U.'s or greater. (Note there is a little decrease in molecular weight as the water to isopropanol ratio is lowered, however the viscosity is unexpectedly seen to rise.)

EXAMPLE III

The following examples illustrate the preparation of copolymers similar to those prepared in Examples I and II, but of varying molecular weights, molar ratios, degrees of final neutralization, etc.

The procedure of Example I was repeated altering the amounts of monomers, cosolvents, initiator and caustic soda for neutralization to provide the results shown in Table II.

TABLE II

| Sample | Ratio acrylic acid to methyacrylate ester (molar) | Water - Cosolvent Ratio Start | Water - Cosolvent Ratio End | pH | Solids | Viscosity cps | Mw | Mn | Turbidity (0.25%, NTU) |
|---|---|---|---|---|---|---|---|---|---|
| IIIA[1] | 50 | 2.3 | 2.6 | 5.1 | 21.5% | 5200 | 15000 | 3700 | 53 |
| IIIB[1] | 50 | 2.0 | 2.5 | 4.5 | 32.4% | 4000 | 7500 | 3600 | 12 |
| IIIC[3] | 25 | infinity | infinity | — | — | — | — | — | — |
| IIID[2] | 25 | 2.0 | 2.5 | 6.8 | 33.9% | 1000 | 7200 | 3000 | 310 |
| IIIE[1] | 25 | 2.3 | 2.6 | 3.8 | 18.5% | 1500 | 32000 | 4700 | 210 |
| IIIF[2] | 12 | 2.0 | 2.5 | 7.6 | 39.3% | 1200 | 3800 | 1500 | 250 |
| IIIG[1] | 6 | 2.0 | 2.4 | 4.5 | 12.8% | 9000 | 27000 | 7200 | 950 |

[1] Normal propanol was used as cosolvent.
[2] Isopropanol was used as cosolvent.
[3] No cosolvent used.

The above results show the effects on the final copolymer of varying the ratio of monomers and/or water and cosolvent used in the initial charges.

Note, in particular, Sample IIIC which did not utilize any cosolvent resulted in a product which was not homogeneous, and which precipitated. All other polymers were opaque liquids which were homogeneous and did not separate on standing for at least two weeks.

Thus, it is seen that copolymers as described above may be prepared with isopropanol or normal propanol using the procedure of the present invention and varying the hydrophilic to hydrophobic monomer ratio within the range of about 6:1 to 50:1; Mw within the range of about 3800 to 32,000; viscosity ranges of 1000 to 9000 cps at desirable high solids levels, and an 0.25% turbidity greater than 10 N.T.U's. It is further noted that the above-described copolymers were readily produced using a water to cosolvent ratio in the range of about 2.0 to 2.6 during the reaction. Based on the properties observed in these polymers as well as the results obtained in Examples I and II, it is contemplated that similar satisfactory results could be obtained using water to cosolvent ratios of about 1.4 to 3.7 during the reaction.

EXAMPLE IV

This example illustrates the use of another hydrophobic monomer, Sipomer LMA ®, a lauryl methacrylate ester available from Alcolac, and the scale-up to larger size equipment.

The procedure of Example I was repeated using an initial monomer charge of 1095 g (15.21 moles) acrylic acid and 155 g (0.605 moles) lauryl methacrylate. An aqueous mixture of 2300 g water and 1300 isopropanol (initial ratio 1.77:1) was employed together with an initiator charge of 20 g sodium persulphate dissolved in 200 g deionized water. The final water; isopropanol ratio was 1.92:1. This product, after distillation, neutralization and solids adjustment was an opaque viscous product, solids 35.2%, viscosity 800 cps (spindle 3, speed 20), pH 7.1, Mw 3300, Mn 1200, 0.25% turbidity 15 N.T.U's.

Based on the results obtained in Examples I, II and III and the similarity in chain length between the respective hydrophobic monomers, it is believed that similar satisfactory results could be obtained using water to cosolvent ratios of about 1.4 to 3.7 during the reaction.

EXAMPLE V

The following examples illustrate the use of methacrylic ester hydrophobic monomers of differing chain lengths.

The procedure of Example I was repeated using the raw materials and amounts shown in Table III. In all cases, acrylic acid was used in a molar ratio of 25:1 acrylic acid to hydrophobic monomer with neutralization, if performed, to the pH values indicated.

Initiator systems are identified as follows: (A) 100 g of 1% sodium persulphate and (B) 100 g of 4% sodium persulphate.

Thus, despite a change in chain length of the alkyl group in the hydrophobic monomer from $C_{10}$ to $C_{17.4}$, the results of Table III show that copolymers of Mw 4000 to 21,000, and viscosity of 3000 to 10,000 at solids levels of 19% to 37% can be obtained using either isopropanol or n-propanol as solvent within the water/cosolvent ratio of about 2.0 to 2.7 during the reaction. Further, it is again contemplated from the properties of the polymers presented in Table III that similar satisfactory results could be obtained using water to cosolvent ratios of about 1.4 to 3.7 during the reaction.

The products were opaque viscous liquids having a diluted 0.25% turbidity of greater than 10 N.T.U.'s, and were homogeneous and stable for a period of at least two weeks.

TABLE III

| Sample | Hydrophobic Monomer | Cosolvent/monomer or Polymer ratio (start) | Cosolvent/monomer or Polymer ratio (end) | Initiator | Water/isopropanol ratio start | Water/isopropanol ratio end | pH | Solids | Viscosity cps | Mn | Mw | Turbidity (0.25%, N.T.U.'s) |
|---|---|---|---|---|---|---|---|---|---|---|---|---|
| VA | C10 | 2.47 | 2.88 | B | 2.00 | 2.50 | 7.2 | 36.3% | 4000 | 1900 | 5000 | 11 |
| VB[1] | C10 | 3.54 | 3.95 | A | 2.31 | 2.69 | 4.3 | 19.0% | 10000 | 2900 | 2100 | 50 |
| VC | C17.4 | 2.36 | 2.76 | B | 2.00 | 2.50 | 7.6 | 36.8% | 3000 | 1600 | 4200 | 690 |
| VD[1] | C17.4 | 3.39 | 3.78 | A | 2.31 | 2.69 | 4.3 | 32.0% | 3500 | 4000 | 20400 | 900 |

Hydrophobic Monomers:
"C10": Methacrylester C10 Analysis: $C_8$ 0.5%; $C_{10}$ 98.5%; $C_{12}$ 1.0%.
"C17.4": Methacrylester C17.4 Analysis: $C_{12}$ 0–2%; $C_{14}$ 4–7%; $C_{16}$ 25–35%; $C_{18}$ 60–67%; $C_{20}$ 0–2%
[1] Normal propanol employed.

EXAMPLE VI

Part A—Preparation of Half Ester Maleate Monomer

To a 2 liter glass reactor equipped with stainless steel stirrer, thermometer, condenser and a water bath was added 372 g of dodecanol (2 moles). The dodecanol was melted and held at 60° C. Then 196 g (2 moles) of maleic anhydride was added over 5 minutes and the mass about 5.3 in order to account for the increased hydrophilic nature of the hydrophobic monomer.

TABLE IV

| Sample | Monomer | Molar ratio | Cosolvent/ Monomer Ratio | Cosolvent/ Polymer Ratio | Water/isopropanol ratio | | pH | Solids | Viscosity (cps) | Mn | Mw | Turbidity (0.25%, N.T.U.'s) |
|---|---|---|---|---|---|---|---|---|---|---|---|---|
| | | | | | Start | End | | | | | | |
| VI | D | 25 | 0.96 | 1.29 | 3.0 | 4.4 | 7.5 | 41.4% | 1800 | 1200 | 3000 | 12 |
| VII A[1] | D | 8.9 | 1.30 | 1.56 | 5.0 | 5.26 | 7.3 | 41.0% | 6400 | 1100 | 3100 | 30 |
| VII B | S | 25 | 1.27 | 1.59 | 1.20 | 1.76 | 8.4 | 37.6% | 9500 | 1900 | 3200 | 36 |
| VII C[1] | S | 8.8 | 1.61 | 1.91 | 3.33 | 3.63 | 8.1 | 32.0% | 5800 | 1900 | 6100 | 54 |

[1]Initiator system:
Oxidant: 28 g tertiary butyl hydroperoxide (70% active) in 15 g isopropanol and 35 g water.
Reductant; 20 g sodium formaldehyde sulphoxylate in 70 g water.

stirred and held at 60° C. for 5 hours.

On cooling, a white waxy solid resulted of mono dodecyl maleate, containing about 2.0% residual maleic anhydride monomer as determined by high pressure liquid chromotography. The product was designed monomer "D".

A sample of mono octadecyl (monostearyl) maleate was prepared in a similar manner, but using 405 g octadecanol (1.5 moles) and 147 g maleic anhydride (1.5 moles).

Again, a white waxy solid resulted, containing about 2.0% residual maleic anhydride monomer. The product was designated monomer "S".

Part B—Preparation of Copolymers

To the reactor was added 300 g water, 56.8 g (0.20 moles) of the mono dodecyl maleate (monomer D), 16.6 g of 48% caustic soda solution (0.20 moles sodium hydroxide) and 100 g isopropanol. The initial charge was heated to 75° C. Over 4 hours was added 360 g of acrylic acid (5.0 moles). The ratio of acrylic acid to maleic half ester was thus 25:1. Simultaneously from the start of addition of the acrylic acid was added independently, over four and a half hours, two initiator streams, 11.4 g of tertiary butyl hydroperoxide (70% active) dissolved in 70 g water and 8 g of sodium formaldehyde sulfoxylate dissolved in 70 g water. After the addition of the initiator steams, the reaction mass was held at 75° C. for a further hour.

The isopropanol was removed by azeotropic distillation until a level of less than 1% was obtained as measured by direct injection gas chromatography, and the product neutralized to approximate neutrality by adding 416 g of 48% caustic soda solution (5.0 moles).

The product was semi-opaque, solids content 41.4%, pH 7.5; Mn 1200; Mw 3000; Viscosity 1800 cps (spindle 4 speed 20), and had an 0.25% turbidity of 12 N.T.U.'s.

The procedure of Example VI was repeated varying the charges as shown in Table IV. (The first entry in Table IV represents the product of Example VI).

All polymers were opaque or semi-opaque liquids which were homogenous and did not separate on standing for at least two weeks and had an 0.25% turbidity of greater than 10 N.T.U.'s.

The results of Table IV show that the process of the present invention can be used to produce a variety of different copolymeric compositions and is not limited to specific hydrophilic and/or hydrophobic monomers. Thus, Example VI utilized half esters which are substantially more hydrophilic than the methacrylate ester of similar hydrophobic chain length and, as such, it is necessary only to adjust the water/cosolvent ratio used during the reaction to within a range of about 1.2 to

EXAMPLE VIII

The following example illustrates the preparation of a terpolymer of acrylic acid, maleic acid and Methacrylester C13 according to the method of the present invention.

To the equipment described previously, an initial charge was made up consisting of deionized water 360 g, isopropanol 200 g, maleic anhydride 98 g, and sodium hydroxide pellets 72 g (1.8 moles).

The alkali/water mix hydrolyzed in situ the maleic anhydride to form 1 mole of maleic acid neutralized to 90%. The reactor and its contents were then heated to 80°–85° C.

Three independent charges were made up and added simultaneously via metering and peristaltic pumps to the reactor over a period of about three hours.

(1) Monomer charge: acrylic acid 252 g, (3.5 moles); Methylacrylester C13 19.4 g (0.076 moles.).

(2) Initiator charge (oxidant): tertiary butyl hydroperoxide (70% active, 5.8 g); deionized water 100 g.

(3) Initiator charge (reductant): sodium formaldehyde sulphoxylate 4.1 g; deionized water 100 g.

The reaction contents were held at 80°–85° C. for a further hour, and the isopropanol substantially removed by azeotropic distillation. On cooling to 40° C., a mixture of sodium hydroxide, 120 g (3 moles) dissolved in 294 g deionized water was added to give a product at approximately pH7.

The product had a calculated mole ratio (in the acid form) of acrylic acid 3.5: maleic acid 1.0 methacrylic ester 0.076.

The polymer was a viscous opaque single phase liquid, solids 41.8%, pH 7.1; viscosity 4800 cps (spindle 2, 10 rpm); Mw 16,500; and Mn 3000, and had an 0.25% turbidity of 72 N.T.U.'s and was stable for a period of at least two weeks.

The monomer, polymer to aqueous solvent as well as the water to cosolvent ratios for Example VIII and for Examples IX to XIII are presented in Table V.

EXAMPLE IX

The procedure of Example VIII was repeated, except that the cosolvent used was normal propanol instead of isopropanol. All other conditions were identical. The polymer was a viscous opaque single phase liquid, solids 41.9%; pH 7.2; viscosity 14,700 cps (spindle 4, 10 rpm); Mw 35,000; Mn 3700, and had an 0.25% turbidity of 67 N.T.U.'s and was stable for a period of at least two weeks.

EXAMPLE X

The procedure of Example VIII was repeated with following changes:

(1) Initial charge: deionized water 400 g, isopropanol 150 g, maleic anhydride 196 g (2.0 moles), sodium hydroxide pellets 144 g (3.6 moles) neutralization of initial charge 90%.

(2) Monomer charge: acrylic acid 216 g (3 moles), Methacrylester C13, 23.6 g (0.093 moles);

(3) Initiator charge (oxidant): tertiary butyl hydroperoxide (70% active) 26.9 g, and deionized water 70 g; and (4) Initiator charge (reductant): sodium formaldehyde sulfoxylate 18.9 g, deionized water 70 g.

For the final neutralization, sodium hydroxide 99 g (2.48 moles) was dissolved in 205 g of deionized water.

The product had a calculated mole ratio (in the acid form) of acrylic acid 3.0:maleic acid 2.0:methacrylic ester 0.093.

The polymer was a viscous opaque single phase liquid, solids 47.4%, viscosity 4000 cps (spindle 4, speed 20 rpm); Mw 9800 and Mn 2000, and had an 0.25% turbidity of 46 N.T.U.'s and was stable for a period of two weeks.

EXAMPLE XI

The procedure of Example VIII was repeated with the following changes:

(1) Initial charge: deionized water 400 g; isopropanol 150 g; maleic anhydride 196 g (2.0 moles); sodium hydroxide pellets 136 g (3.4 moles) (neutralization of 85%).

(2) Monomer charge: acrylic acid 216 g (3 moles); Methacrylester C13 50 g (0.197 moles).

(3) Initiator charge (oxidant): tert. butyl hydroperoxide (70% active) 28.5 g; deionized water 70 g.

(4) Initiator charge (reductant): sodium formaldehyde sulphoxylate 19.9 g; deionized water 70 g.

Final neutralization was with sodium hydroxide 107 g (2.67 moles) dissolved in 235 g of deionized water.

The product had a calculated mole ratio (in the acid form) of acrylic acid 3.0:maleic acid 2.0:methacrylic ester 0.197.

The product was a viscous, opaque single phase liquid, solids 49.4%, viscosity 3500 cps (spindle 4, speed 20 rpm); Mw 5700; Mn 1500, and pH 7.5, an 0.25% turbidity of 120 N.T.U.'s and was stable for a period of at least two weeks.

EXAMPLE XII

Another polymer was prepared using the procedure and materials of Example XI but changing the water content to 250 g and the isopropanol to 250 g.

The resulting product was a homogeneous, viscous, semi-opaque single phase liquid with solids 43.4%, viscosity 1320 (spindle 3, speed 20) Mw 6200 Mn 1400 and pH 8.1, 0.25% turbidity of 18 N.T.U.'s and was stable for a period of at least two weeks.

EXAMPLE XIII (COMPARATIVE)

The procedures of Examples IX and X were repeated reducing the levels of n-propanol and isopropanol in the initial charge to 100 g and 75 g, respectively. The procedure of Example XI was also repeated varying the amount of water to 225 g and the isopropanol to 400 g in the initial charge.

These polymers, designated XIIIA, XIIIB and XIIIC respectively, were viscous products which separated into two distinct phases standing over a period of several days.

TABLE V

| Sample | Water/Cosolvent Ratio Start | Water/Cosolvent Ratio End | Solids | Viscosity cps | Mw | Mn | Turbidity (0.25%, N.T.U.'s) |
|---|---|---|---|---|---|---|---|
| VIII | 1.80 | 2.80 | 41.8% | 4800 | 16500 | 3000 | 72 |
| IX[(1)] | 1.80 | 2.80 | 41.9% | 14700 | 35000 | 3700 | 67 |
| X | 2.67 | 3.50 | 47.4% | 4000 | 9800 | 2000 | 46 |
| XI | 2.67 | 3.60 | 49.4% | 3500 | 5700 | 1500 | 120 |
| XII | 1.00 | 1.56 | 43.4% | 1320 | 6200 | 1400 | 18 |
| XIIIA[(1)] | 3.80 | 5.6 | — | — | — | — | — |
| XIIIB | 7.30 | 7.20 | — | — | — | — | — |
| XIIIC | 0.56 | 0.91 | — | — | — | — | — |

[(1)]Cosolvent was normal propanol.

As the results of Table V indicate, an acrylate, maleate, methacrylester C13 terpolymer can be prepared with Mw of 5000 to 40,000 at a conveniently usable solids and viscosity relationship using a water to cosolvent ratio of about 1.0 to 3.6 during the reaction, and obtaining an opaque or semi-opaque product with an 0.25% turbidity greater than 10 N.T.U.'s which is stable for at least two weeks.

It is to be noted that as a different hydrophilic monomer combination, maleic acid and acrylic acid, is employed, it is thus necessary to slightly alter the water to cosolvent ratio from that observed in prior examples where acrylic acid was used as the sole hydrophilic monomer.

EXAMPLE XIV

The following example illustrates the production of copolymers of acrylic acid and vinyl esters.

The procedure of Example I was essentially repeated to prepare two polymers (XIVA and XIVB) using acrylic acid and vinyl laurate in a mole ratio of 25:1.

In the case of XIVA, isopropanol was used as the cosolvent with an initiator system of 100 g of 4% sodium persulphate. Copolymer XIVB was prepared using normal propanol and an initiator of 100 g of 1% sodium persulphate, with final neutralization to pH 4 using approximately 0.28 moles of 10% sodium hydroxide.

In a similar manner copolymers XIVC and XIVD were prepared from a 25:1 ratio of acrylic acid to VeoVa ®, a vinyl ester of Versatic 10 ® (a $C_{10}$ isomeric mixture of synthetic saturated mono-carboxylic acid) available from Shell.

The properties of the polymers are presented in Table VI. As the results show, these polymers can be produced within Mw ranges of about 4000 to 30,000 with viscosities of approximately 250 to 2000 cps at relatively high solids levels (e.g., about 30 to 38%) using the process of the present invention with water to cosolvent (isopropanol or normal propanol) ratios during the reaction of 2.0 to 2.7, with an 0.25% turbidity of greater than 10 N.T.U.'s which is stable for at least two weeks. Again, since the hydrophobic polymers are similar to the Methacrylester polymers of Examples I and II it is contemplated that that similar satisfactory results could be obtained using water to cosolvent ratios of about 1.4 to 3.7 during the reaction.

438 g of a 60% aqueous solution of DMDAAC (1.63 moles) was pumped into the reaction vessel for a period of about 3 hours, keeping the reaction mass at 80°-85° C., simultaneously introducing over a period of 4 hours by pumping in an independent stream of an initiator solution consisting of 100 g of 8% aqueous solution of sodium persulphate. The reactor contents were held at

TABLE VI

| Sample | Cosolvent/ Monomer Ratio | Cosolvent/ Polymer Ratio | Water/Cosolvent Ratio Start | End | pH | Solids | Viscosity (cps) | Mw | Mn | Turbidity (0.25%, N.T.U.'s) |
|---|---|---|---|---|---|---|---|---|---|---|
| XIVA | 2.47 | 2.88 | 2.00 | 2.50 | 6.8 | 38.7% | 350 | 4400 | 2000 | 34 |
| XIVB[(1)] | 3.55 | 3.97 | 2.31 | 2.69 | 4.0 | 29.6% | 800 | 27400 | 7700 | 84 |
| XIVC | 2.47 | 2.88 | 2.00 | 2.50 | 7.2 | 34.1% | 250 | 4600 | 2100 | 32 |
| XIVD[(1)] | 3.55 | 3.97 | 2.31 | 2.69 | 4.0 | 32.3% | 2000 | 29500 | 7400 | 71 |

[(1)]N-propanol was employed as cosolvent.

EXAMPLE XV

The following example illustrates the production of copolymers of acrylic acid and a surfactant type methacrylate, KB3 methacrylate, approximately of the composition:

$$CH_2{:}C(CH_3)COO(C_2H_4O)_3C_{12}H_{25}$$

The procedure of Example I was essentially repeated to prepare 3 polymers (XV A-C) using acrylic acid and the surfactant type methacrylate in a mole ratio of 25:1. The cosolvent was isopropanol, the initiator 80 g of a 5% solution of sodium persulphate, and neutralization with 230 g of 48% sodium hydroxide solution. The cosolvent/monomer ratio was 2.3 and the cosolvent/polymer ratio was 2.6. The properties of these polymers are presented in Table VII.

An opaque copolymer is obtained (XV A) at a low viscosity, high solids with a 0.25% turbidity of greater than 10 NTU's, and this was stable for a period in excess of 2 weeks, using a water/cosolvent ratio of 5.0-5.8 during the reaction. When the water/cosolvent ratio is less than 3.5 during the reaction, a very high viscosity, low solids product (XV, B,C) is obtained where the 0.25% turbidity is less than 10 N.T.U.'s.

80°-85° C. for a period of a further half hour. The ratio of hydrophilic to hydrophobic monomer was 25:1 moles, and the ratio of water (from all sources) to cosolvent was 7.0:1 at the end of the reaction. Removal of the cosolvent was effected as in Example I, and no pH adjustment was made to the product.

Molecular weight distribution of the polymer could not be determined by gel permeation chromatography because of the highly cationic nature of this polymer and subsequent adsorption on the GPC columns. Instead, a measure of molecular weight was made by measuring a standard viscosity (S.V.), determined at 15.0% solids, 23° C. in a 1.0 molar sodium chloride solution using a Brookfield Synchro-Lectric ® viscometer, Model LVT with a LCP adaptor, at a speed of 60 rpm.

The polymer prepared as Example XVI A had a solids content of 47.9%, a viscosity of 250 cps, a SV of 5.3, pH 1.7, was opaque with a 0.25% turbidity of 215 N.T.U.'s, and was stable for a period of at least 2 weeks.

Using the same prodcedure as Example XVI A, 6 additional polymers (XVI B-G) were prepared in order to determine the precise final water/cosolvent ratios useful in the preparation of this specific copolymer. The water/cosolvent amounts were varied as noted in Table VIII.

TABLE VII

| Sample | Water/Cosolvent Ratio Start | End | pH | Solids | Viscosity cps | Mw | Mn | Turbidity (0.25%, N.T.U.'s) |
|---|---|---|---|---|---|---|---|---|
| XV A | 5.0 | 5.8 | 7.1 | 36.2% | 1150 | 8200 | 3000 | 26 |
| XV B | 3.0 | 3.5 | 7.2 | 35.2 | 15000 | 5200 | 1400 | 2.1 |
| XV C | 2.0 | 2.5 | 7.6 | 30.2 | 7200 | 4100 | 1500 | 1.1 |

EXAMPLE XVI A

The following example illustrates the production of copolymers of dimethyl diallyl ammonium chloride (DMDAAC) and Methacrylester 13.

To the reaction vessel set up as in Example I was added an initial charge of 25 g deionized water, 25 g (0.098 moles) Methacrylester 13, 188 g of a 60% aqueous solution of DMDAAC (0.70 moles), 0.5 g ethylene diamine tetra acetic acid, tetra sodium salt (EDTA) and 50 g of isopropanol as the cosolvent.

Stable opaque products were produced (XVI A-D) with a 0.25% turbidity of greater than 10 N.T.U.'s, which were stable for a period of at least 2 weeks with convenient high solids and low viscosities, when a final water/isopropanol ratio was approximately in the range 1.6-7.0.

When the water/isopropanol ratio was outside this range (comparative Examples XVI E-G), the product phased into two layers on standing for a period of a week.

TABLE VIII

| Sample | Amount of Solvent (grams) Added to Initial Charge | | Final Water/ Isopropanol Ratio | pH | Solids | Viscosity (cps) | S.V. | Turbidity (0.25%, N.T.U.'s) |
|---|---|---|---|---|---|---|---|---|
| | Water | Isopropanol | | | | | | |
| XVI A | 25 | 50 | 7.0 | 1.7 | 47.9% | 250 | 5.3 | 215 |
| XVI B | 50 | 100 | 4.0 | 1.7 | 52.7% | 350 | 4.1 | 240 |
| XVI C | 65 | 225 | 1.9 | 1.8 | 55.3% | 450 | 3.9 | 49 |
| XVI D | 50 | 250 | 1.6 | 1.7 | 53.7% | 250 | 3.9 | 75 |
| XVI E | 0 | 750 | 0.5 | — | — | — | — | — |
| XVI F | 75 | 50 | 8.5 | — | — | — | — | — |
| XVI G | 250 | 50 | 13.0 | — | — | — | — | — |

EXAMPLE XVII A

TABLE IX

| Sample | Reactants Used | | Mole Ratio DMDAAC: Methacrylester 13 | Final Water/ Isopropanol Ratio | pH | Solids | Viscosity (cps) | S.V. | Turbidity (0.25%, N.T.U.'s) |
|---|---|---|---|---|---|---|---|---|---|
| | Isopropanol (g) | Methacryl ester 13 (g) | | | | | | | |
| XVII A | 50 | 25 | 25:1 | 8.0 | 1.1 | 43.6% | 620 | 12.9 | 12.5 |
| XVII B | 125 | 25 | 25:1 | 3.2 | 1.0 | 44.3% | 260 | 7.0 | 21 |
| XVII C[(1)] | 150 | 62 | 10:1 | 4.0 | 1.3 | 50.3% | 480 | 5.3 | 120 |
| XVII D | 125 | 124 | 5:1 | 3.2 | 1.0 | 46.3% | 260 | 5.4 | 115 |

[(1)]100 g of 12% sodium persulphate was used.

The following example illustrates the production of DMDAAC Methacrylester 13 copolymers, using a slightly different procedure to that of Example XVI, and covering different standard viscosities (S.V.'s), and mole ratios.

The initial charge was deionized water 50 g, EDTA 0.5 g, DMDAAC (60% aqueous) 125 g (0.46 moles). Three independent streams of reactants were pumped in, keeping the reaction mass at 80°-85° C., being DMDAAC (60% aqueous) 500 g (1.86 moles) over 3 hours; a mixture of isopropanol as cosolvent, 50 g and Methacrylester 13, 25 g (0.094 moles) over 3 hours, and 100 g of 8% solution aqueous solution of sodium persulphate over 4 hours. The reactor contents were held at 80°-85° C. for a period of a further hour. The ratio of hydrophilic to hydrophobic monomer was 25:1 molar, and the ratio of water (from all sources) to cosolvent was 8.0:1 at the end of the reaction. Polymer work up was similar to Example XVI A.

The polymer prepared as Example XVII A had a solids content of 43.6%, a viscosity of 620 cps, a S.V. of 12.9, pH 1.1, and was semi-opaque with a 0.25% turbidity of 12.5 N.T.U.'s, and was stable for a period of at least 2 weeks.

Using the same procedure as Example XVII A, 3 additional polymers (XVII B-D) were prepared in order to illustrate variation in S.V., and mole ratios of hydrophilic to hydrophobic monomer. The initial charge, and monomer addition remained identical to Example XVII A. Variations were made in the amount of isopropanol, Methacrylester 13 and sodium persulphate used, and are noted in Table IX.

Thus stable, opaque and semi-opaque products can be produced with a 0.25% turbidity of greater than 10 N.T.U.'s, which were stable for a period of at least 2 weeks, with convenient high solids and low viscosities, when a final water/isopropanol ratio was in range 3.2-8.0, mole ratio of DMDAAC to methacrylester 13 of 25:1 to 5:1, and SV of 5.3 to 12.9.

Based on the properties observed in these polymers as well as the results obtained in example XVI A-G, it is contemplated that similar satisfactory results could be obtained using water to cosolvent ratios of about 1.6-8.0 during the reaction.

What is claimed is:

1. A process for the preparation of polymers containing at least one hydrophilic monomeric component and at least one hydrophobic monomeric component comprising the step of polymerizing the monomers in the presence of free radical polymerization initiators in an aqueous medium consisting of water and a cosolvent, wherein the amount of water miscible cosolvent is monitored so as to maintain the ratio of water to cosolvent equal or greater than unity during the reaction, thereby keeping the polymer as it forms in a sufficiently mobile condition and preventing homopolymerization and precipitation of the polymer from the hydrophobic monomer; thereby producing a polymer as a relatively high solids, low viscosity, opaque or semi-opaque product which is stable and slightly cloudy, opaque or semi-opaque, which exhibits no gelling, coagulation or product separation on standing and which, upon dilution to 0.25% solids content w/w, has a turbidity of at least 10 Nephelometric Turbidity units.

2. The process of claim 1 wherein the hydrophilic monomer is selected from the group consisting of ethylenically unsaturated amides and their N-substituted derivatives, ethylenically unsaturated carboxylic acids or dicarboxylic acids, ethylenically unsaturated quaternary ammonium, compounds, sulfoalkyl esters of unsaturated carboxylic acids, aminoalkyl esters of unsaturated carboxylic acid, vinyl or allyl amines, diallyl amines and diallyl ammonium compounds, vinyl heterocyclic amides, vinyl aryl sulfonates, vinyl alcohol obtained by the hydrolysis of vinyl acetate, acrolein, allyl alcohol, vinyl acetic acid, sodium vinyl sulfonate, sodium allyl sulfonate, their corresponding salts or mixtures thereof.

3. The process of claim 1 wherein the hydrophobic monomer is selected from the group consisting of aliphatic hydrocarbon moieties having at least five carbons, polynuclear aromatic hydrocarbon groups alkylaryls wherein the alkyl groups have one or more carbon atoms, haloalkyls of 5 or more carbon atoms, polyalkylenoxy groups wherein alkylene is propylene or high alkylene and there is at least one alkyleneoxy unit per hydrophobic moiety, siloxanes and mixtures thereof.

4. The process of claim 3 wherein the hydrophobic monomer is selected from the group consisting of the higher alkyl esters of alpha, beta ethylenically unsaturated carboxylic acids, alkyl esters and half esters derived from the reactions of alkanols having from 5 to 50 carbon atoms with ethylenically unsaturated carboxylic acids, alkylaryl esters of ethylenically unsaturated carboxylic acids, N-alkyl - ethylenically unsaturated amides, and derivatives thereof, a-olefins, vinyl alkylates wherein alkyl has at least 4 carbon atoms, vinyl alkyl esters, N-vinyl amides, alkylstyrenes, and mixtures thereof.

5. The process of claim 1 wherein the ratio of hydrophilic to hydrophobic monomers varies from about 100:1 to 5:1.

6. The process of claim 1 wherein the hydrophobic and hydrophilic monomers are selected so as to produce a polymer of the formula:

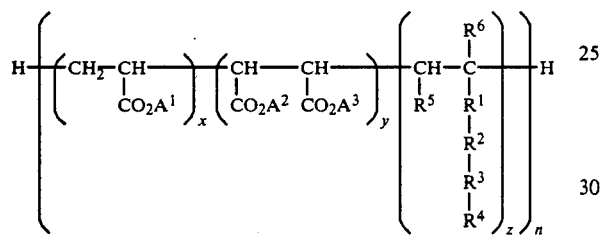

wherein
z is 1; (x+y): z is from 5:1 to 100:1; in which the monomer units may be in random order; y being from 0 up to a maximum equal to the value of x: and n is at least 1;

$R^1$ represents $-CO-O$, $-O-$, $-O-CO-$, $-CH_2-$, $-CO-NH-$ or is absent;

$R^2$ represents from 1 to 50 independently selected alkyleneoxy groups, preferably ethylene oxide or propylene oxide groups, or is absent, provided that when $R^3$ is absent and $R^4$ represents hydrogen, then $R^2$ must contain an alkyleneoxy group with at least 3 carbon atoms;

$R^3$ represents a phenylene linkage, or is absent;

$R^4$ represents hydrogen or a $C_{5-24}$ alkyl or $C_{5-24}$ alkenyl group, with the provisos that:
(a) when $R^1$ represents $-O-CO-$, $R^2$ and $R^3$ must be absent and $R^4$ must contain at least 5 carbon atoms and
(b) when $R^2$ is absent, $R^4$ is not hydrogen and when $R^3$ is absent then $R^4$ must contain at least 5 carbon atoms;

$R^5$ represents hydrogen or a group of formula $-COOA^4$;

$R^6$ represents hydrogen or $C_{1-4}$ alkyl; and $A^1$, $A^2$, $A^3$ and $A^4$ are independently selected from hydrogen, alkali metals, alkaline earth metals, ammonium and amine bases.

7. The process of claim 1 wherein the hydrophobic and hydrophilic monomers are selected so as to produce a polymer of the formula:

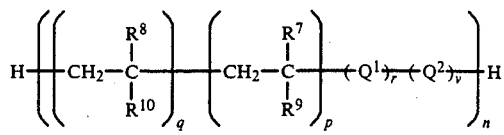

wherein:
$Q^1$ is a multifunctional monomer, wherein the monomers of the polymer may be connected to $Q^1$ in any direction, in any order;

$Q^2$ is a molecular entity of the formula:

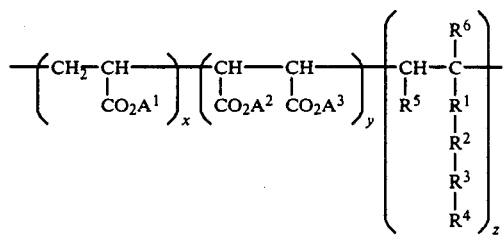

wherein
z is 1; (x+y): z is from 5:1 to 100:1; in which the monomer units may be in random order; y being from 0 up to a maximum equal to the value of x: and n is at least 1; v is 1; and (x+y+p+q+r): z is from 5:1 to 100:1 in which the monomer units may be in random order;

$R^1$ represents $-CO-O$, $-O-$, $-O-CO-$, $-CH_2-$, $-CO-NH-$ or is absent;

$R^2$ represents from 1 to 50 independently selected alkyleneoxy groups, preferably ethylene oxide or propylene oxide groups, or is absent, provided that when $R^3$ is absent and $R^4$ represents hydrogen, then $R^2$ must contain an alkyleneoxy group with at least 3 carbon atoms;

$R^3$ represents a phenylene linkage, or is absent;

$R^4$ represents hydrogen or a $C_{5-24}$ alkyl or $C_{5-24}$ alkenyl group, with the provisos that:
(a) when $R^1$ represents $-O-CO-$, $R^2$ and $R^3$ must be absent and $R^4$ must contain at least 5 carbon atoms and
(b) when $R^2$ is absent, $R^4$ is not hydrogen and when $R^3$ is absent then $R^4$ must contain at least 5 carbon atoms;

$R^5$ represents hydrogen or a group of formula $-COOA^4$;

$R^6$ represents hydrogen or $C_{1-4}$ alkyl;

$Q^1$ is a multifunctional monomer, wherein the monomers of the polymer may be connected to $Q^1$ in any direction, in any order;

$R^7$ and $R^8$ represent $-CH_3$ or $-H$;

$R^9$ and $R^{10}$ represent substituent groups selected from the group consisting of amino, amine, amide, sulphonate, sulphate, phosphonate, phosphate, hydroxy, carboxyl and oxide groups or $(C_2H_4O)_tH$, wherein t is from 1-50, and wherein the monomer units may be in random order; and $A^1$, $A^2$, $A^3$ and $A^4$ are independently selected from hydrogen, alkali metals, alkaline earth metals, ammonium and amine bases.

8. The process of claim 1 wherein the hydrophobic and hydrophilic monomers are selected so as to produce a polymer of the formula:

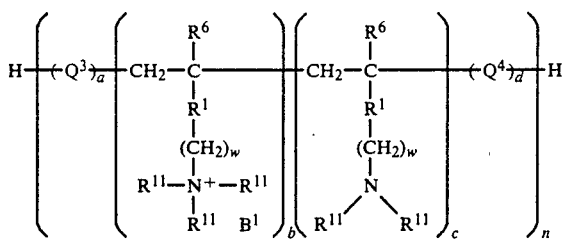

wherein
$Q^3$ is derived from a monomeric unit:

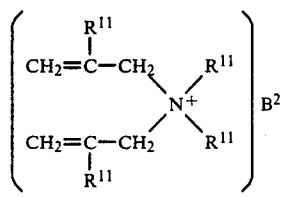

$Q^4$ is derived from the molecular entity:

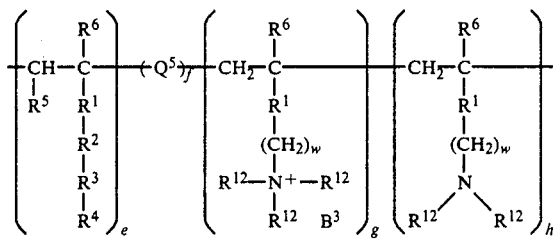

and $Q^5$ is derived from a monomeric unit:

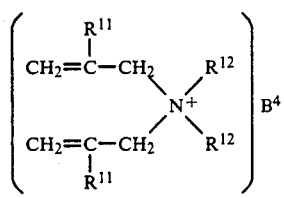

$R^1$ represents —CO—O, —O—, —O—CO—, —CH$_2$—, —CO—NH— or is absent;

$R^2$ represents from 1 to 50 independently selected alkyleneoxy groups, preferably ethylene oxide or propylene oxide groups, or is absent, provided that when $R^3$ is absent and $R^4$ represents hydrogen, then $R^2$ must contain an alkyleneoxy group with at least 3 carbon atoms;

$R^3$ represents a phenylene linkage, or is absent;

$R^4$ represents hydrogen or a $C_{5-24}$ alkyl or $C_{5-24}$ alkenyl group, with the provisos that:

$R^5$ represents hydrogen or a group of formula —COOA$^4$;

$R^6$ represents hydrogen or $C_{1-4}$ alkyl; and (a) when $R^1$ represents —O—CO—, $R^2$ and $R^3$ must be absent and $R^4$ must contain at least 5 carbon atoms and (b) when $R^2$ is absent, $R^4$ is not hydrogen and when $R^3$ is absent then $R^4$ must contain at least 5 carbon atoms;

(a+b+c):Q$^4$ is from 5:1 to 100:1, in which the monomer units may be in random order, a, b, c, d, e, f, g, h may be an integer of zero, n is at least 1;

w is zero to 4;

$R^{11}$ is independently selected from hydrogen or $C_1$-$C_4$ alkyl;

$R^{12}$ is independently selected from $C_5$ to $C_{24}$ alkyl or alkenyl, aryl, cycloalkyl, hydroxyalkyl, or alkoxyalkyl; and $B^1$, $B^2$, $B^3$, $B^4$ are organic or inorganic anions.

9. The process of claim 1 wherein the cosolvent is selected from the group consisting of isopropanol, n-propanol, acetone, lower ($C_1$ to $C_4$) alcohols, esters, and ketones.

10. The process of claim 9 wherein the cosolvent is isopropanol or normal propanol.

11. The process of claim 1 wherein the free radical polymerization initiator is a thermal decomposition initiator.

12. The process of claim 1 wherein the free radical polymerization initiator is a redox initiator.

13. The process of claim 1 wherein the initiator is present in an amount of 0.1 to 5% by weight based on the sum of the monomers.

14. The process of claim 1 wherein the monomers are present in a total weight of 10 to 55% of the polymerization mixture.

15. The process of claim 1 wherein the hydrophilic monomer is acrylic acid, the hydrophobic monomer is a methacrylic ester of chain length 10 to 18, isopropanol or normal propanol is used as the cosolvent, and wherein the water to cosolvent ratio during the reaction is within the range of 1.4 to 3.7.

16. The process of claim 1 wherein the hydrophilic monomer is acrylic acid, the hydrophobic monomer is a half ester maleate containing 12 to 18 carbon atoms, isopropanol or normal propanol is used as the cosolvent and wherein the water to cosolvent ratio during the reaction is within the range of 1.2 to 5.3.

17. The process of claim 1 wherein the hydrophilic monomers are acrylic acid and maleic acid, the hydrophobic monomer is a methacrylate ester of chain length 10 to 18, isopropanol or normal propanol is used as the cosolvent and wherein the water to cosolvent ratio during the reaction is within the range of 1.0 to 3.6.

18. The process of claim 1 wherein the hydrophilic monomer is dimethyl diallyl ammonium chloride, the hydrophobic monomer is a methacrylate ester of chain length 10 to 18, isopropanol or normal propanol is used as the cosolvent, and wherein the water to cosolvent ratio during the reaction is within the range of 1.6 to 8.0.

19. The process of claim 1 wherein the hydrophilic monomer is acrylic acid, the hydrophobic monomer is a vinyl ester, isopropanol or normal propanol is used as the cosolvent and wherein the water to cosolvent ratio during the reaction is within the range of 1.4 to 3.7.

* * * * *